United States Patent [19]

Marioni

[11] Patent Number: 5,434,491
[45] Date of Patent: Jul. 18, 1995

[54] ELECTRONIC DEVICE FOR STARTING A SYNCHRONOUS MOTOR WITH PERMANENT-MAGNET ROTOR

[75] Inventor: Elio Marioni, Dueville, Italy

[73] Assignee: Askoll S.p.A., Povolaro Dueville, Italy

[21] Appl. No.: 70,834

[22] Filed: Jun. 3, 1993

[30] Foreign Application Priority Data

Jun. 17, 1992 [IT] Italy .................. PD92A0107

[51] Int. Cl.⁶ .............................. H02P 5/28
[52] U.S. Cl. .................... 318/700; 318/716
[58] Field of Search ................ 318/700–701, 318/703, 705–707, 712, 714–715, 716–719, 254, 138, 439, 474–479, 720–724, 767, 778–779, 781–786, 797, 798–799, 805–812, 445–446, 449, 459; 310/40 R, 46, 152, 156, 162, 179–181, 184–187

[56] References Cited

U.S. PATENT DOCUMENTS

| | | | |
|---|---|---|---|
| 3,739,248 | 6/1973 | Wehde | 318/138 |
| 4,084,120 | 4/1978 | Lund | 318/599 |
| 4,085,355 | 4/1978 | Fradella | 318/168 |
| 4,251,758 | 2/1981 | Pedersen et al. | 318/254 |
| 4,262,241 | 4/1981 | Azusawa | 318/703 |
| 4,278,927 | 7/1981 | Grohe | 318/721 |
| 4,409,532 | 10/1983 | Hollenbeck et al. | 318/749 |
| 4,441,063 | 4/1984 | Roof et al. | 318/722 X |
| 4,443,747 | 4/1984 | Chausse et al. | 318/723 |
| 4,492,910 | 1/1985 | Radacanu | 318/703 X |
| 4,697,125 | 8/1987 | Goff et al. | 318/254 |
| 4,743,815 | 5/1988 | Gee et al. | 318/254 |
| 5,142,214 | 8/1992 | Purson et al. | 318/722 |
| 5,173,651 | 12/1992 | Buckley et al. | 318/701 |
| 5,350,990 | 9/1994 | Austermann et al. | 318/701 |

FOREIGN PATENT DOCUMENTS

| | | |
|---|---|---|
| 0363264 | 4/1990 | European Pat. Off. . |
| 0400455 | 12/1990 | European Pat. Off. . |
| 3209394 | 9/1983 | Germany . |

OTHER PUBLICATIONS

Patent Abstracts of Japan–vol. 11, No. 88 (E–490) 18 Mar. 1987 & JP-A-61240868 (Matsushita Seiko Co. Ltd) 27 Oct. 1986.

*Primary Examiner*—David S. Martin
*Attorney, Agent, or Firm*—Guido Modiano; Albert Josif

[57] ABSTRACT

Device for starting a synchronous motor with a permanent-magnet rotor, particularly with two stator poles and two rotor poles, including a static power switch, a triac, arranged in series between the stator winding of the motor and the alternating-voltage source at mains frequency. The triac is controlled by an electronic circuit which processes three factors, namely the current flowing through the coil of the synchronous motor, the position and polarity of the permanent magnet of the rotor, and the polarity of the alternating-voltage source.

9 Claims, 6 Drawing Sheets

ELECTRONIC DEVICE FOR STARTING A SYNCHRONOUS MOTOR WITH PERMANENT-MAGNET ROTOR

BACKGROUND OF THE INVENTION

The present invention relates to an electronic device for starting a synchronous motor with permanent-magnet rotor particularly suitable, in its configuration, for starting a motor with two stator poles and two rotor poles.

As is known, synchronous motors have considerable problems in starting due to the fact that the rotor must pass from a condition in which its speed is zero to a condition in which it is frequency-locked with the power supply source.

If the power supply source is the ordinary power distribution grid, the frequency is 50 or 60 Hz, and in these conditions the rotor would have to attain synchronous speed in a time equal to one half-period.

This is very often troublesome, especially when the rotor has a significant mass and when the starting contrast torque is nonzero.

In practice, one may say that the problem always occurs in all motors of this type.

Many solutions have been sought in order to overcome this problem and to allow use of this type of motor, which is advantageous as regards efficiency and speed stability once the power supply grid frequency is locked onto.

However, known solutions are particularly complicated and consequently expensive, and are therefore such that they cannot be used conveniently in motors which must have a low cost.

These solutions entail, by means of memories residing within the electronic device, the application of a current having an effect equivalent to that of a current having a frequency which varies from zero to the running value in a preset time.

In practice, the rotor, independently of its actual conditions, is accelerated by means of a transient until it can then be locked directly onto the mains power supply.

As mentioned, the componentry of these devices is complicated and expensive.

SUMMARY OF THE INVENTION

The aim of the present invention is to provide an electronic device for starting a synchronous motor with permanent-magnet rotor which is particularly simple and thus has an extremely low cost.

A further object is to provide a safe and reliable device for starting a motor, particularly of the type with two stator poles and two rotor poles.

Another object is to adapt the electrical parts of the motor so that they cooperate advantageously with the starting device.

The proposed aim and objects and others which will become apparent hereinafter are achieved by an electronic device for starting a synchronous motor with permanent-magnet rotor, comprising at least one static switch arranged in series at least one stator winding of said synchronous motor; an alternating current voltage source connected in series with said motor; position sensing means adapted to detect the position of the rotor of said motor; a phase-shift means connected to said position sensing means; an XOR gate whose inputs are the output of said phase-shift means and said alternating current voltage source; wherein said static switch is driven by the output of said XOR gate.

This torque arises from the correct combination of the polarity of the stator flux and of the intrinsic polarity of the permanent magnet of the rotor.

BRIEF DESCRIPTION OF THE DRAWINGS

Further characteristics and advantages will become apparent from the following detailed description of embodiments given only by way of non-limitative example and illustrated in the accompanying drawings, wherein.

DESCRIPTION OF THE PREFERRED EMBODIMENTS

Figure 1:
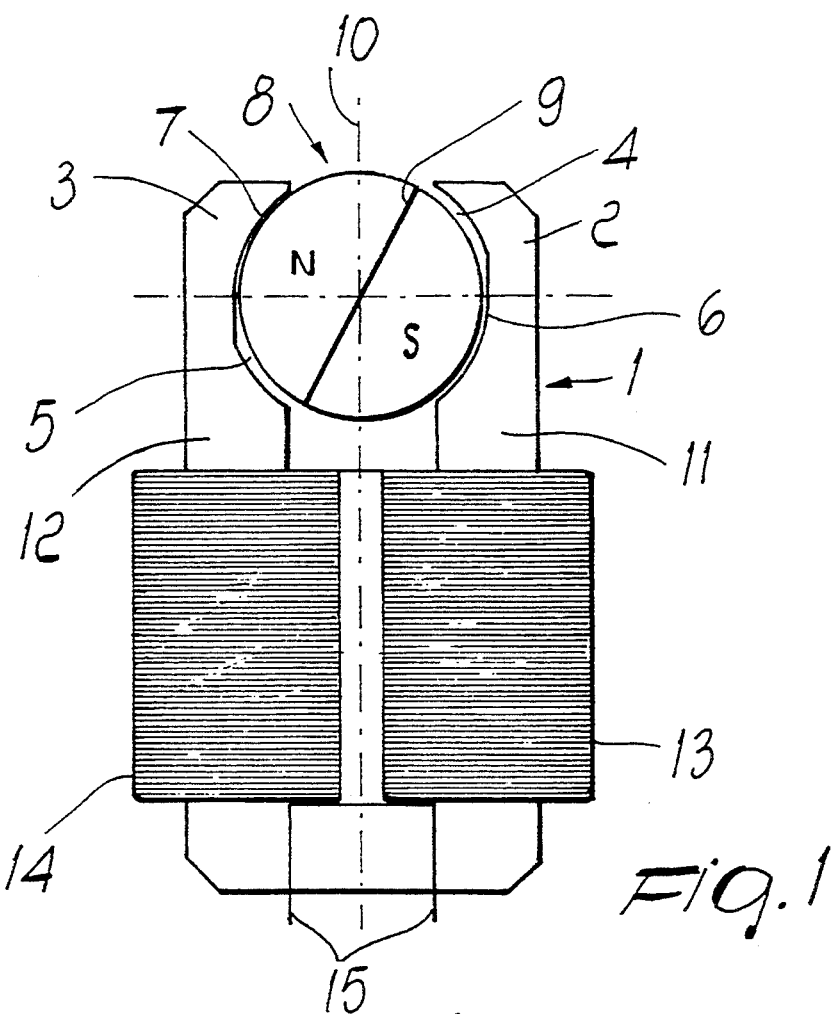
FIG. 1 is a schematic view of a synchronous motor with two stator poles and with a permanent-magnet rotor of the type which can be started with the device according to the present invention.
Figure 2:
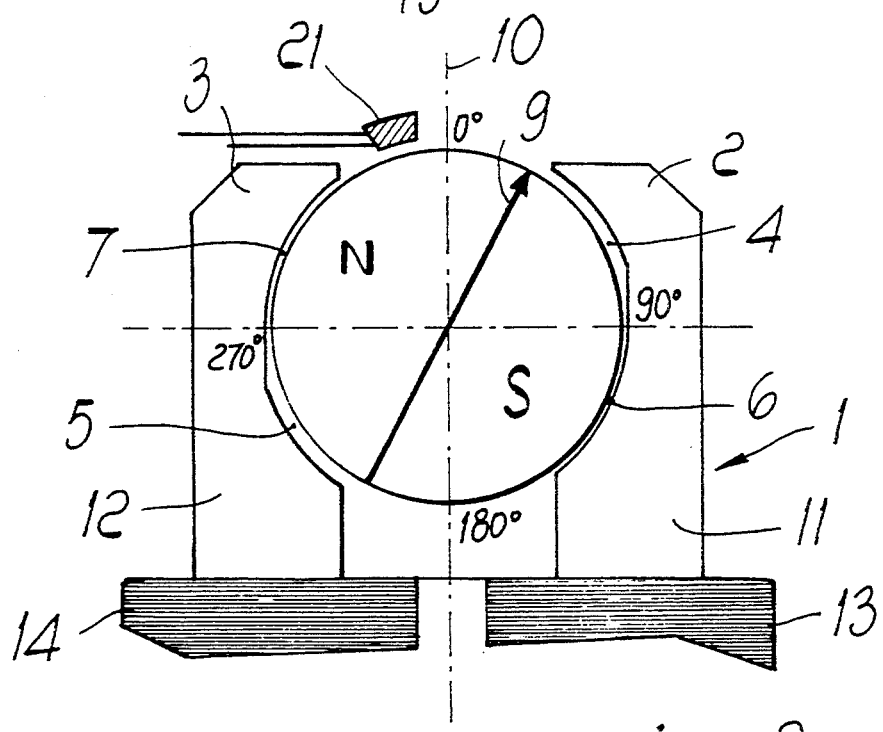
FIG. 2 is an enlarged-scale view of the rotor and of the poles of the motor according to FIG. 1, illustrating the location of the sensor suitable to detect the angular position of the rotor and its polarity.

With reference to the above figures, the synchronous motor on which the starting device according to the present invention is combined is composed of a stator pack 1 provided with two unbalanced poles 2 and 3 and made so that it has two gap regions, respectively 4 and 5, which are wider than two other respectively consecutive regions 6 and 7.

With this configuration, the permanent-magnet rotor 8 arranges the ideal line 9, which separates its north and south, not so that it coincides with the median axis 10 of the stator pack but so that it is tilted by a certain angle.

At startup, with this configuration the rotor 8 can start more easily in an intended direction.

Two energization windings 13 and 14 are provided on the two posts 11 and 12 of the stator pack respectively, are connected in series and are powered, through the terminals 15, by the alternating-voltage source.

Figure 3:
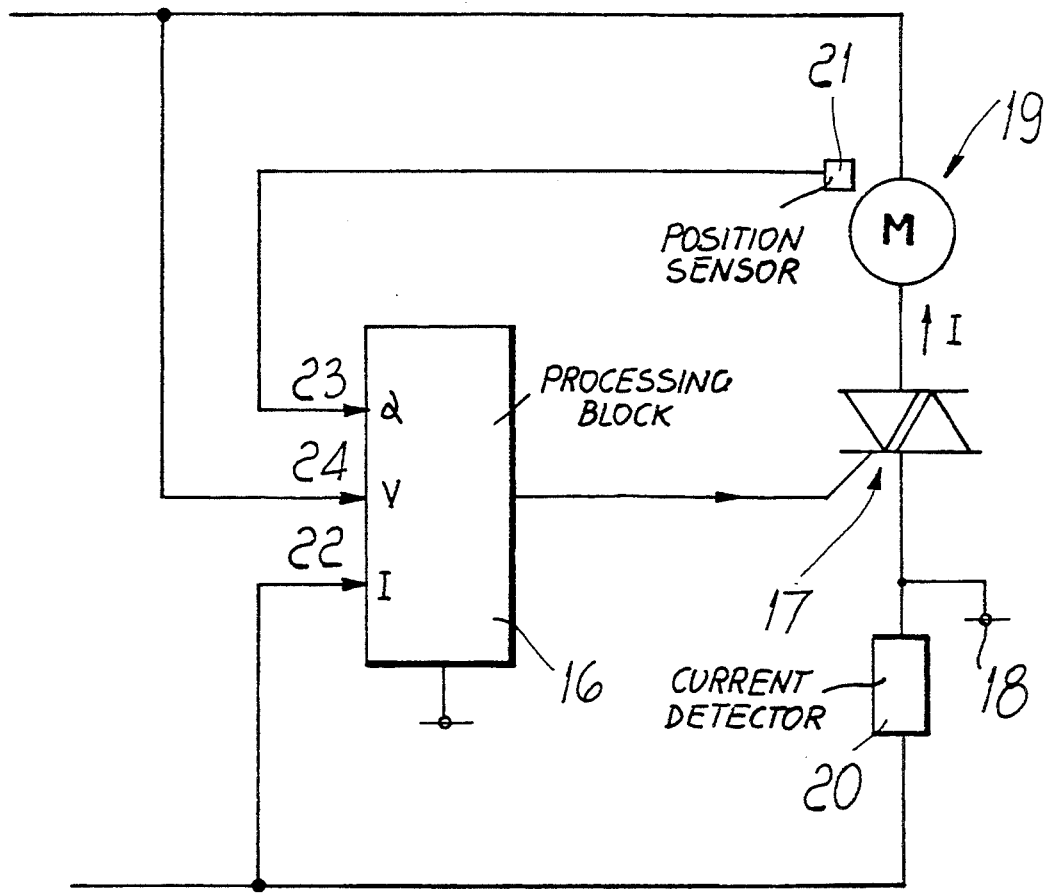
FIG. 3 is a general block diagram of the power supply of the permanent-magnet synchronous motor of the rotor according to FIG. 1.

The electronic circuit that powers the stator windings is schematically shown in FIG. 3 and is composed of a processing block 16 which drives a static power switch 17, constituted for example by a triac arranged in series between the alternating-voltage source 18 and the permanent-magnet synchronous motor, now designated by the reference numeral 19 in FIG. 3.

The same series network also includes a detector 20 for the current I which flows through the triac 17 and then through the motor 19.

Its response in terms of signal is an input signal for the electronic processing block 16, with criteria which are described hereinafter.

There is also a sensor 21 suitable for detecting the position and polarity of the permanent magnet composing the rotor of the synchronous motor 19 both when the rotor is moving and when it is in particular operating conditions or when it is motionless or stalled at zero speed.

The current-related signal detected by means of the device 20 enters the block 16 through the input 22, whereas the signal of the position sensor enters the same block through the input 23; a third signal 24 is input to the block 16 and detects the polarity of the alternating-voltage source 18.

Figure 4:
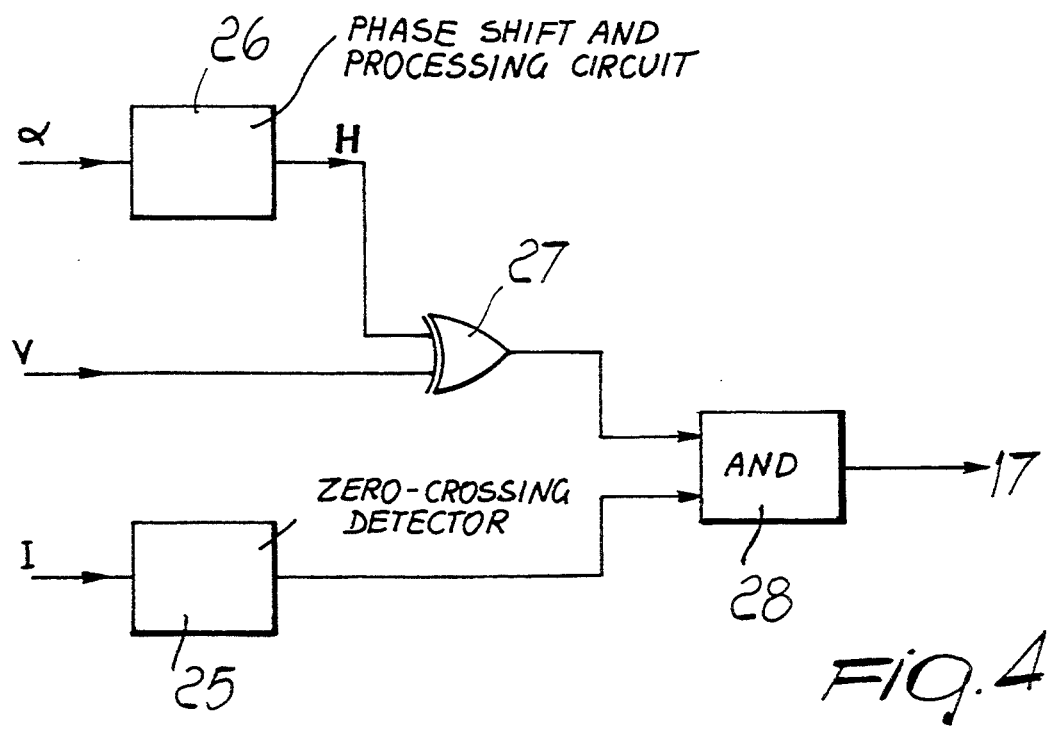
FIG. 4 is a block diagram of the triac control device.

The block 16 is shown schematically more clearly in FIG. 4.

It is an electronic logic circuit which, by receiving the signals from the inputs 22, 23 and 24 and by converting said signals into digital form, provides the control signal for closing or opening the static switch 17 constituted by the triac arranged in series with the motor.

More particularly, the current signal provided by the block 20 enters a zero-crossing detector 25 which provides in output a logic signal 1 when said current tends to zero.

Said block receives as input the signal provided by the device 20, and detects the zero-crossing of the current I which flows in the motor.

The output is a logical "1" signal indicating that said current I approaches zero with a positive or negative deviation from the zero value of said current.

This deviation depends on the type of motor used and on its application, as well as on the type of static power switch being used.

The signal arriving from the sensor 21, which conveniently can be of the Hall-effect type, enters a phase-shift and processing circuit 26, the output whereof is 1 or 0 according to the position and polarity of the rotor.

The electronic processing of the phase shift and of the position of the rotor of the synchronous motor, which is an enabling component of the AND gate after it has been combined in XOR with the voltage signal V, is used to optimize the conditions of maximum average torque value during starting, i.e. from zero speed up to the synchronous speed, thus optimizing the interaction between the magnetic flux generated by the current I and the field of the permanent magnet in the two half-cycles from 0° to 180° and from 180° to 360°.

This output, as well as the signal processed from the mains voltage, enter an XOR 27 which outputs a "1" signal if the input V 24 is equal to zero and H (which is the output of 26) is equal to 1 or if V 24 is equal to 1 and H (which is the output of 26) is equal to zero.

The output of 25 and the output of 27, thus in digital form, enter the electronic logic circuit 28 in an AND combination which provides in output the control signal for closing or opening the static power switch 17.

Therefore, the AND gate with two inputs and the signal processing system allow to determine two conditions:

1) the alternating voltage V is positive, the current I is proximate to zero, and the rotor rotation angle is between 0° and 180°;

2) the alternating voltage V is negative, the current I is proximate to zero, and the rotor rotation angle is between 180° and 360°.

These two conditions are given by way of example after selecting a rotor rotation direction.

Figure 5:
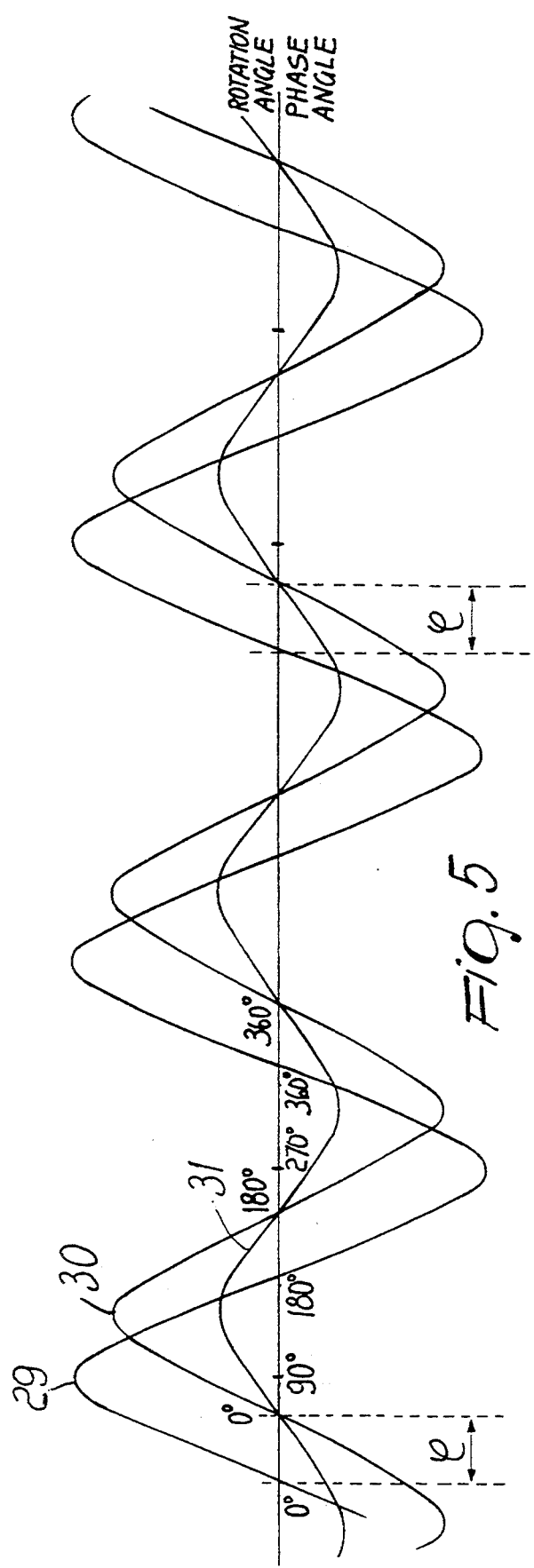
FIG. 5 plots the characteristics of voltage, current and rotor position when synchronization is achieved.

FIG. 5 plots the characteristics of the system in synchronous conditions.

In this case, it can be seen that the sinusoid 29, which is the time-based plot of the source of the alternating voltage applied to the synchronous motor, is phase-shifted by an angle $\epsilon$ with respect to the sinusoid 30 representing the current absorbed by the motor.

This phase shift angle is very large, since the motor has a low resistive component in its stator winding and a high inductive component; consequently, the zero-crossing of the current cannot be made to coincide with the zero-crossing of the power supply source voltage.

This electronic phase shift of the position of the permanent magnet thus allows to have the maximum possible instantaneous average torque during the dynamic step to allow the acceleration of the rotating masses and thus overcome the moments of inertia, which have a decisive effect during this step up to the normal operating speed, when the acceleration step ends and the motor locks onto a rotation rate which is proportional to the frequency of the alternating power supply source.

If the motor has a torque sufficient to rotate the rotating masses involved at this synchronous speed, this locking occurs spontaneously, i.e. the motor controls itself by means of the electronic circuit with which it is combined.

The plot of the signal indicating the position of the permanent magnet which composes the rotor, designated by the reference numeral 31, is instead exactly in phase with the current, and the three curves have the same frequency.

Figure 6:
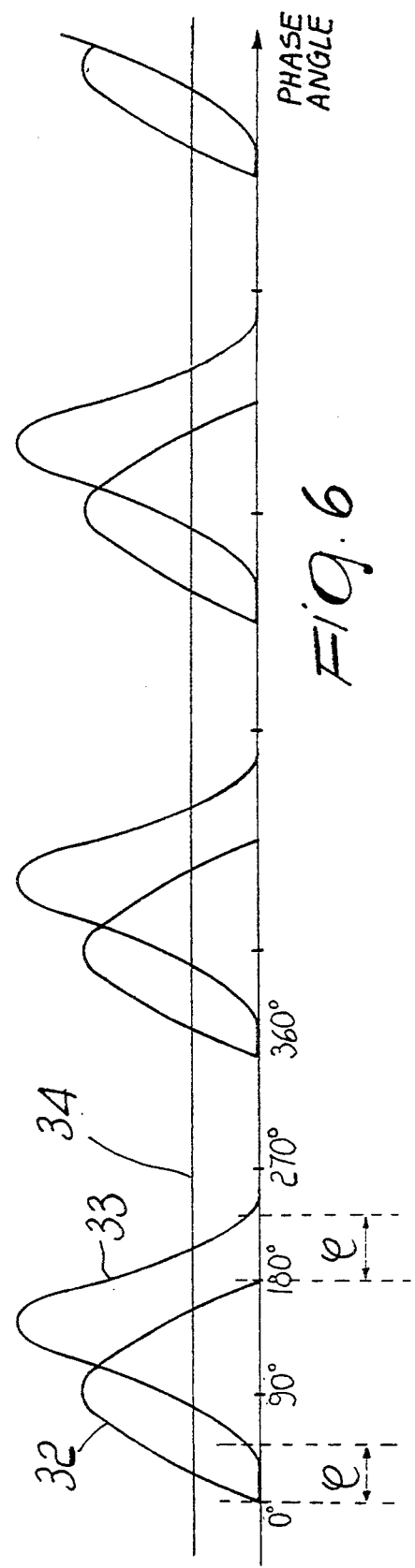
FIG. 6 plots the same characteristics as FIG. 5 when the rotor is stalled or motionless.

FIG. 6 instead shows the condition in which the rotor is stalled, as occurs for example at startup.

The voltage sinusoid, now designated by the reference numeral 32, and the current sinusoid, designated by the reference numeral 33, are present only with their half-wave which is concordant with the plot of the position of the rotor which, being stalled, is a straight line which is parallel to the time axis and substantially indicates a zero frequency for the rotor.

In these conditions, the rotor receives torque pulses due to the current-voltage combination; these pulses are always unidirectional and tend to start it moving in the required direction.

For particular applications, it may be convenient to use two, energization windings in the motor.

A first winding, termed as the starting winding, is sized so as to develop a greater instantaneous average torque in order to rotate the motor from zero speed to the synchronous speed.

A second winding, termed as the sustaining winding, is sized so as to develop a smaller torque which is in any case sufficient to keep the rotor locked onto the frequency of the supply source according to the load for which it has been sized.

Figure 7:
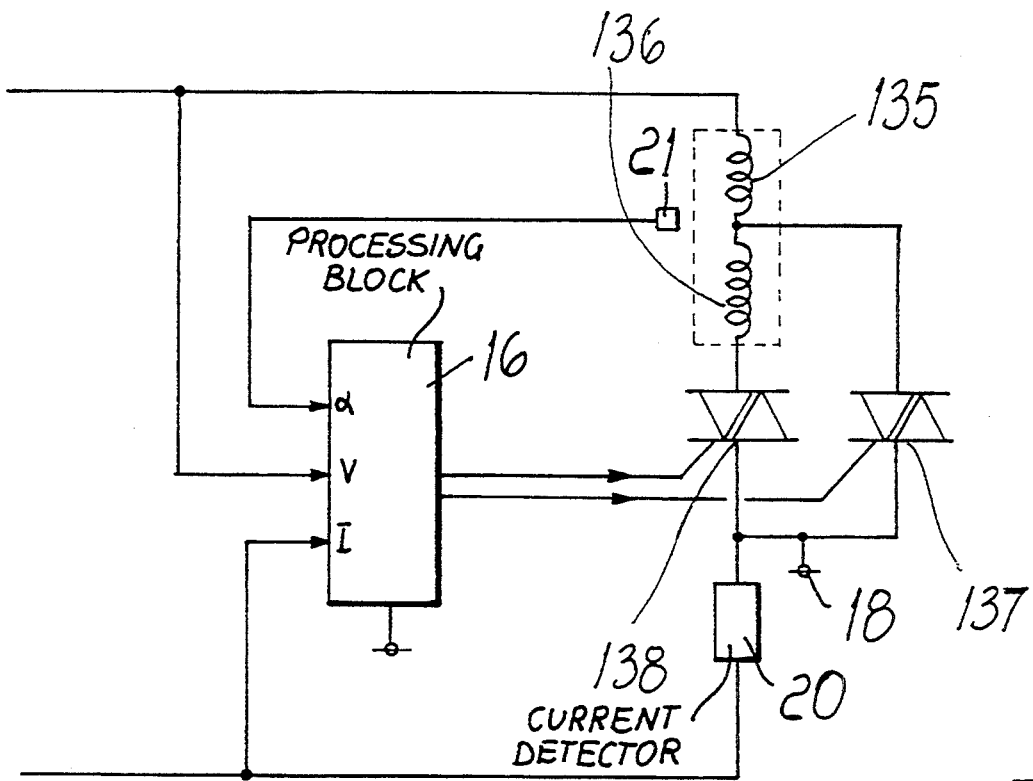
FIGS. 7 to 12 are diagrams of equivalent devices suitable for motors with particular utilization characteristics.

This embodiment is shown schematically in FIG. 7.

In this case, the motor has been shown schematically with a pair of inductance coils, respectively a starting coil 135 and a sustaining coil 136, arranged so as to form an inductive divider.

Each one of the two inductance coils 135 and 136 is supplied by a triac, respectively a starting triac 137 and a sustaining triac 138.

Figure 8:
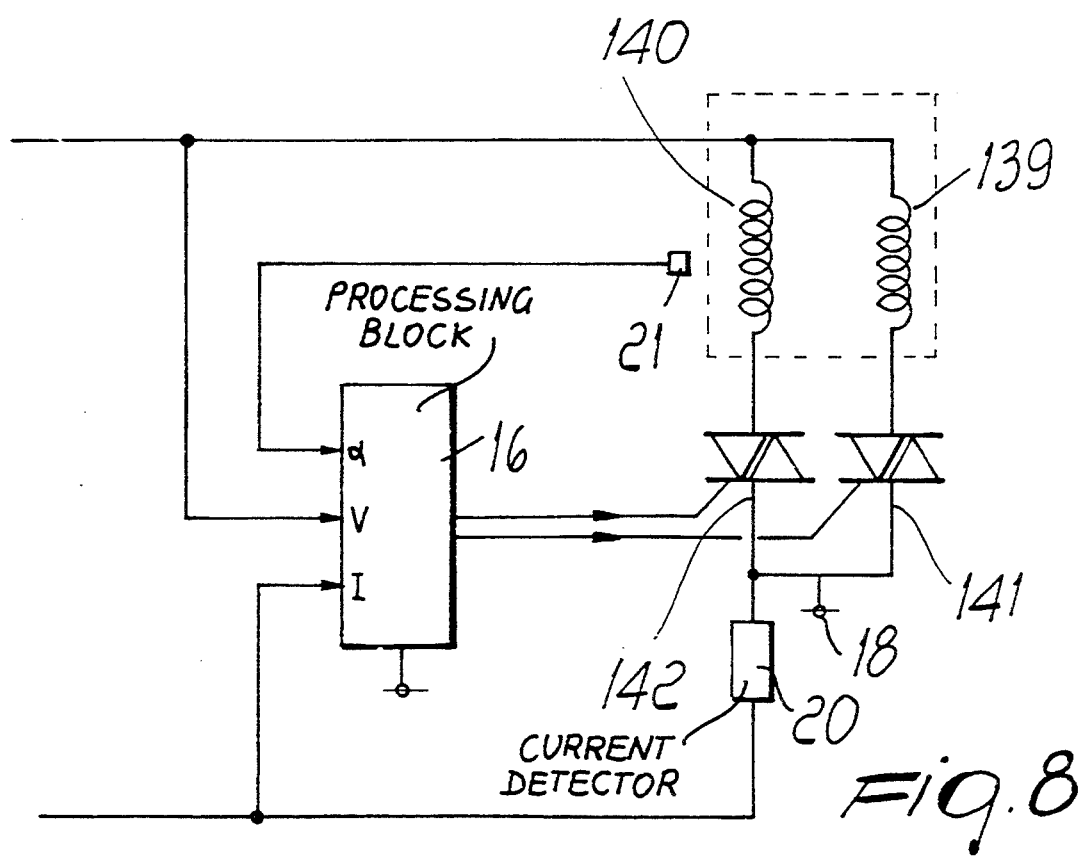

As an alternative to this arrangement, the two starting and sustaining windings may be arranged as in FIG. 8, i.e. no longer in series to each other but substantially parallel.

In this case, the starting winding is the one designated by the reference numeral 139, whereas the sustaining winding is the one designated by the reference numeral 140.

In this case, too, there are two triacs, respectively a starting triac 141 and a sustaining triac 142.

The two structures of FIGS. 7 and 8 are substantially equivalent both in principle and in operation.

The two triacs operate in a mutually exclusive manner in both cases.

Initially, the triacs of the startup winding, i.e. the triacs 137 and 141, are made to conduct; then, once the synchronous condition has been reached, these triacs open, whereas those of the sustaining circuits, i.e. those designated by 138 and 142, close.

Figure 9:
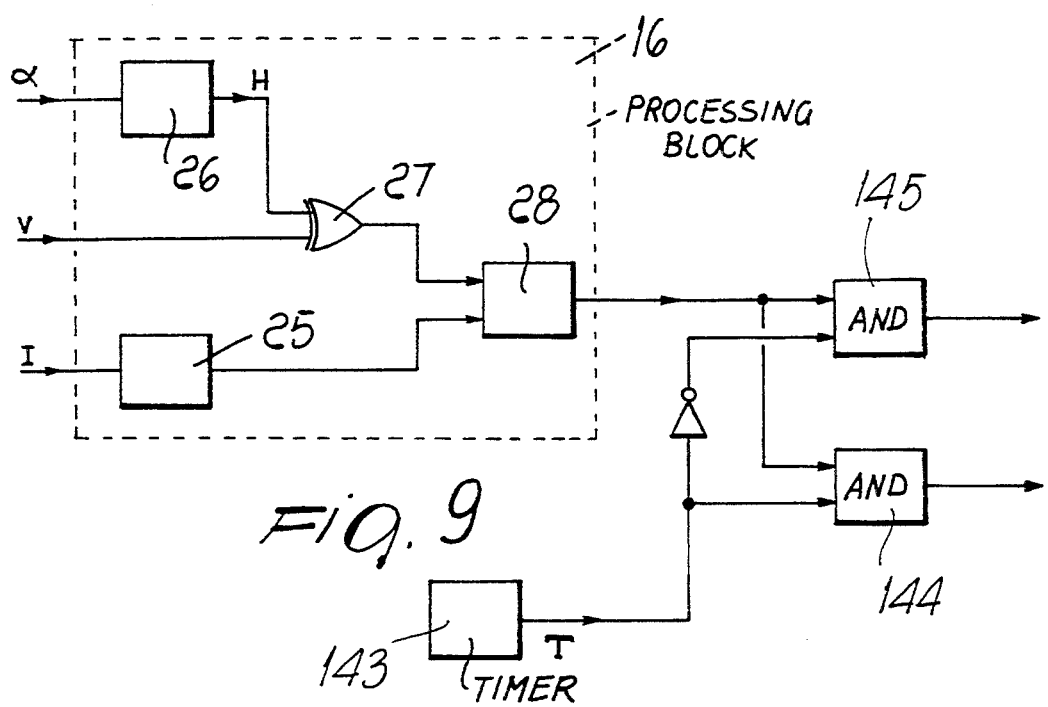

The electronic circuit allowing to pass from the starting condition to the sustaining or normal condition is shown schematically in FIG. 9.

In this figure, the portion delimited by the dashed lines is exactly equivalent to the one of the FIG. 3 explained previously.

In this circuit of FIG. 9, the block 143 is a timer having the purpose of providing a logic signal T for a precisely defined time, which can in any case be calibrated; by means of an AND gate 144, this signal allows to send the control pulses to the gate of the starting triac, simultaneously disengaging the sustaining triac, which is in the open-switch condition.

After the preset time T, during which the rotor has or should have reached synchronous speed, the pulses are automatically sent, by means of a further AND gate 145, to the sustaining triac, simultaneously disabling the starting triac, which passes into the open-switch condition.

In order to reset the entire system, i.e. to return to the initial conditions, re-enabling the starting winding, the motor system and its electronic part must be disconnected for a few moments from the alternating-voltage power supply source.

This dual-winding structure is justified mainly in motors in which the rotating elements, such as for example the permanent-magnet rotor, have heavy masses, thus requiring during pickup or starting a greater torque than that required once synchronization has been reached.

Another advantage is that it is possible to lock the rotor of the motor onto the synchronous speed even with alternating-voltage source values which are relatively very low with respect to nominal normal operating values.

It is also possible to have a motor having a smaller size, and thus less weight, less physical bulk and thus a considerable saving in iron as well as the advantage of an extremely high efficiency, since the intrinsic losses of the motor decrease.

It should furthermore be noted that once the synchronous condition, in which only the sustaining winding is engaged, is reached, there is a weaker current than at startup, with a reduction in the heating of said winding.

Due to various reasons, the motor may not reach synchronous speed in the time T, set by the timer 143, after which the two windings are switched.

In this case, the motor would be subjected to a continuous dynamic step of acceleration of rotating masses, with a consequent high power absorption, but with a condition in which the winding is sized for synchronous-speed working conditions.

These phenomena could entail a considerable heating of the motor with the consequent risk of failure.

In addition to this, since the rotor is of the permanent-magnet type, if this step lasts for a prolonged time the magnet may demagnetize.

The extreme and most dangerous condition occurs when the rotor of the motor is stalled, i.e. when the contrast torque applied to the shaft is greater than the motor torque.

In such conditions, the current absorbed by the motor has an extremely high value, with consequent overheating in a short time.

Figure 10:
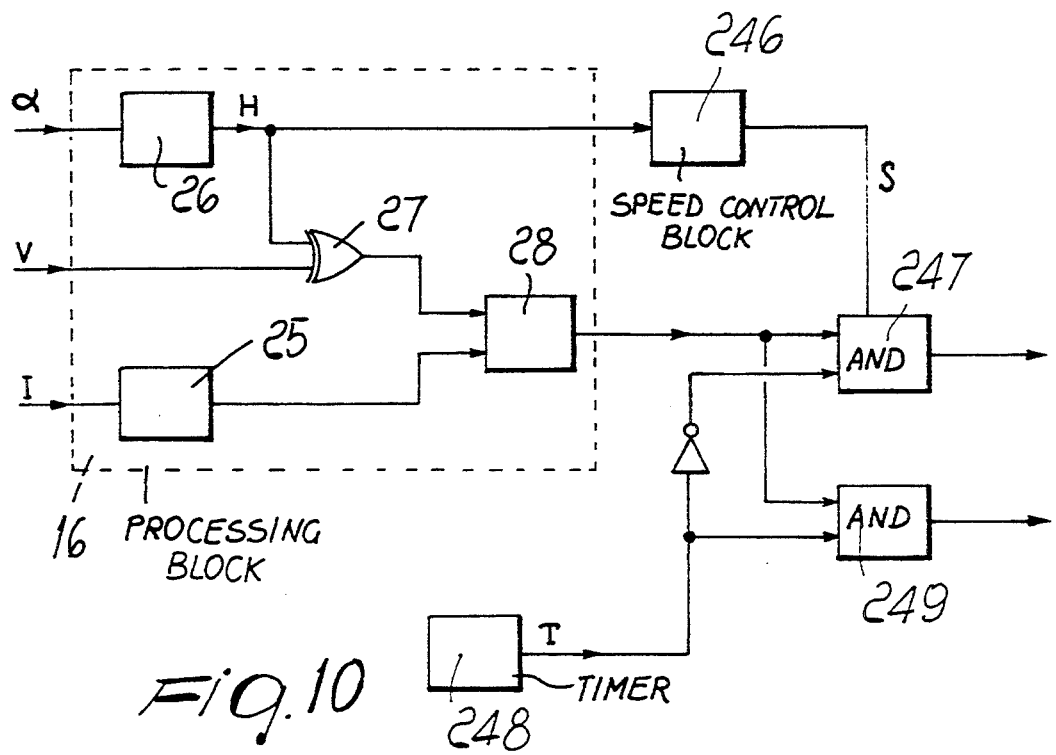

In order to obviate this drawback, a modified circuit, shown in FIG. 10, is provided.

In said figure, the input of the speed control block 246 is the digital signal H, which is the response of the position sensor, and its output is a digital signal S which is the input for the AND gate 247.

Said signal S is an enabling signal for processing, or not processing, the control pulses for the sustaining triac and thus for enabling the power supply of the sustaining winding.

In this case, operation occurs according to the following steps:

1) the starting winding is engaged for a fixed time T, set by the timer 248, driving the starting triac by means of the AND gate 249 and simultaneously disabling the sustaining triac by means of the further AND gate 247;

2) after the time T, obviously represented by a logic signal provided by the timer 248, the starting winding is disabled and the sustaining winding is engaged automatically, as described earlier.

Throughout the starting step, the speed control block 246 with the related output signal S does not affect the behavior of the system constituted by the electronics and the motor;

3) if the motor has reached synchronous speed, the speed control block 246 provides a logic signal S, for example a "1", which allows the AND gate 247 to send the control pulses to the sustaining triac and thus to make the motor run normally at synchronous speed;

4) if the motor has not reached synchronous speed and therefore has a rotation rate smaller than the synchronous rate or has a zero rate (in the case of a stalled rotor), the speed control block 246 provides a logic signal S, for example a "0", which provides a zero logic signal at the output of the AND gate 247 and thus at the gate of the sustaining triac.

The triac is thus open and the motor is no longer connected to the alternating-voltage source, and the current through its winding consequently becomes nil.

It is convenient to allow the possibility of calibrating the rotation rate at which a logic signal S of zero value which opens the circuit can be provided by means of the speed control block 246, so that said rate is lower than the rotation rate of the rotor when it is synchronous.

The concept and the functionality expressed by the speed control block 246 of FIG. 10 can also be applied to a motor with a single winding, such as the one already shown in FIG. 1.

Figure 11:
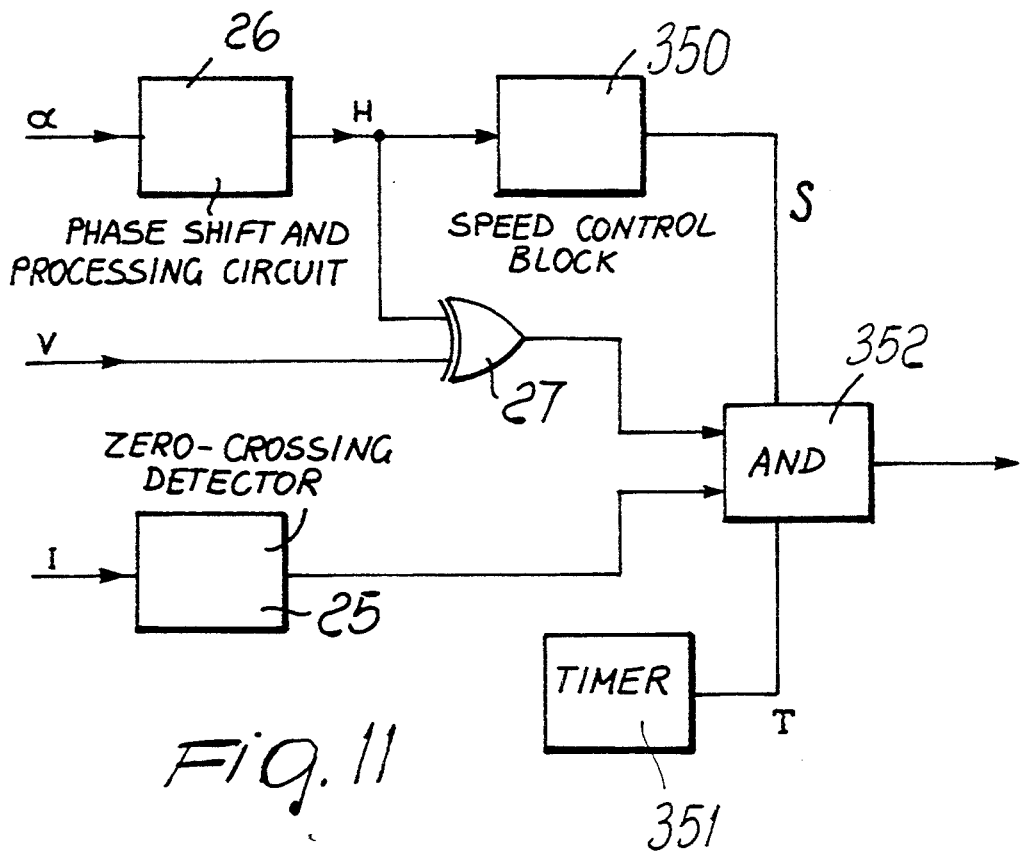

In this configuration, the block diagram is shown in FIG. 11, wherein the functions performed by the speed control block 246 of FIG. 10 are now performed by the speed control block 350 of FIG. 11.

The block 351 is the timer, which in this case sets a time T to allow the motor to accelerate up to synchronous speed; if this does not occur, the speed control block 350, by means of the logic signal S, for example zero, prevents the logic unit composing the AND gate 352 from sending the pulses to the gate of the triac (which is a single triac in this case), preventing the conduction of said triac.

If instead the motor, in the set time T, is able to accelerate the rotating masses up to synchronous speed, the speed control block 350 provides a digital signal S, for example 1, to allow the normal driving of the triac and thus the normal operation of the motor at synchronous speed.

Here, too, as in the case of a dual-winding system, the rotation rate at which it is possible to provide, by means of the speed control block 350, a zero-value logic signal S which opens the power circuit can be calibrated electronically to a rotation rate which must be lower than the rotation rate of the rotor when it rotates at synchronous speed.

Figure 12:
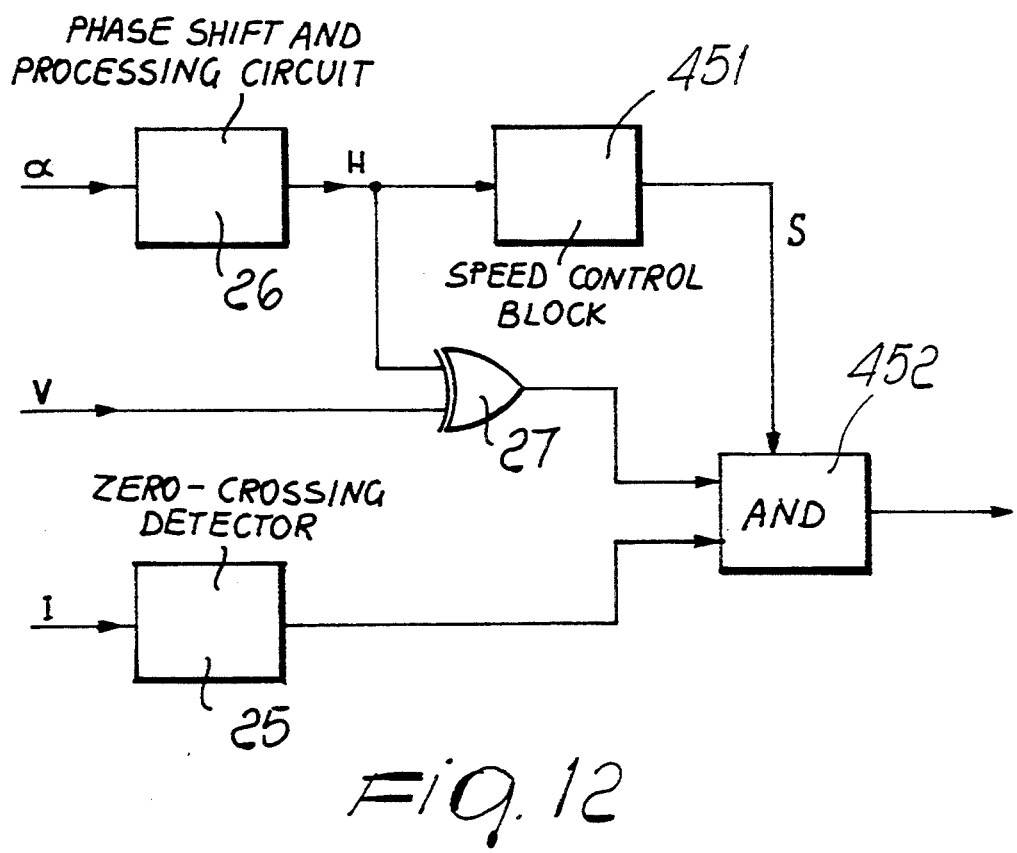

In the case of a motor with a single coil, a further modification for disengaging the motor supply voltage is shown in the block diagram of FIG. 12.

The protective function is performed by the speed control block 451.

In this case, too, the speed control block 451 provides a logic signal S which allows the AND gate 452 to send, or not sent, the triggering pulses to the triac (which is single in this case too), in order to allow the normal operation of the motor or its disengagement, disconnecting the power supply voltage from it.

In this case, however, the circuit designated by the speed control block 451 has a certain hysteresis, i.e. it acts with a certain lag (which can be calibrated by an electronic circuit) with respect to the occurrence of the incorrect operation of the motor, for example when the rotor stalls momentarily for accidental reasons due to the load applied to the shaft of the motor itself.

In this case, too, the system can be calibrated by means of an electronic circuit to determine the rotation rate below which this protection must act and disconnect the motor from the alternating-voltage supply source.

The speed control block 451 provides a signal S, for example having a logical value 1, if synchronous speed has been reached, and then enables the AND gate 452 so that it can provide the triggering pulses to the triac for the normal operation of the motor; it provides a logic signal S, for example zero, if this speed has not been reached, disabling the entire system.

In this case, too, if the system has been disabled, in order to reset it it is necessary to remove voltage from the system constituted by the electronics and the motor and return it after some time.

From what has been described and illustrated it can be seen that the intended aim and objects have all been achieved and that in particular a device and some variations thereof have been provided which are suitable to allow the starting of synchronous motors so that with a short transient the speed of the rotor locks onto the frequency of the power supply grid.

In addition to this, the device is particularly simple in its components and can thus be fitted even on small low-cost motors.

The device is furthermore provided, when prescribed by safety requirements or by statutory provisions, with systems suitable to check whether the motor has started incorrectly, disconnecting it completely from the power supply.

Obviously, as already shown, the device can assume different configurations and use different components; all this is within the protective scope of the present application.

I claim:

1. Electronic device for starting a synchronous motor with a permanent-magnet rotor, comprising:
    at least one static switch arranged in series with at least one stator winding of said synchronous motor;
    an alternating current voltage source connected in series with said motor;
    position sensing means adapted to detect the position of the rotor of said motor;
    a phase-shift means connected to said position sensing means;
    an XOR gate whose inputs are the output of said phase-shift means and said alternating current voltage source;
    wherein said static switch is driven by the output of said XOR gate.

2. Electronic device, according to claim 1, wherein said static switch is a triac.

3. Electronic device, according to claim 1, further comprising:
    current detecting means connected in series with said motor;
    zero-crossing detecting means connected to said current detecting means;
    an first AND gate receiving in input the output of said zero-crossing detecting means and said XOR gate;
    the output of said AND gate being connected to said static switch.

4. Electronic device, according to claim 3, further comprising a comprises speed control means driven by said phase-shift means and adapted to enable said first AND gate when said motor reaches synchronous speed.

5. Electronic device, according to claim 4, further comprising a timer adapted to enable said first AND gate.

6. Electronic device, according to claim 3, further comprising
    a timer;
    a second AND gate driving a first stator winding;
    a third AND gate driving a second stator winding;
    wherein said second AND gate receives in input an inverted output of said timer and the output of said first AND gate; and said third AND gate receives in input the output of said timer and the output of said first AND gate.

7. Electronic device, according to claim 6, wherein said first and second stator winding are connected in series.

8. Electronic device, according to claim 6, wherein said first and second stator winding are connected in parallel.

9. Electronic device, according to claim 6, further comprising a speed control means driven by said phase-shift means and adapted to enable said second AND gate when said motor reaches synchronous speed.

* * * * *